Sept. 8, 1925.

G. E HOWARD 1,553,290

VALVE FOR MOLTEN GLASS

Filed April 13, 1923

2 Sheets-Sheet 1

INVENTOR
George E. Howard
By Kay, Totten & Brown,
Attorneys

Sept. 8, 1925.

G. E. HOWARD

VALVE FOR MOLTEN GLASS

Filed April 13, 1923 2 Sheets-Sheet 2

INVENTOR
George E. Howard
By Kay, Totten & Brown,
Attorneys

Patented Sept. 8, 1925.

1,553,290

UNITED STATES PATENT OFFICE.

GEORGE E. HOWARD, OF BUTLER, PENNSYLVANIA, ASSIGNOR TO HARTFORD-EMPIRE COMPANY, OF HARTFORD, CONNECTICUT, A CORPORATION OF DELAWARE.

VALVE FOR MOLTEN GLASS.

Application filed April 13, 1923. Serial No. 631,849.

*To all whom it may concern:*

Be it known that I, GEORGE E. HOWARD, a citizen of the United States, and resident of Butler, in the county of Butler and State of Pennsylvania, have invented a new and useful Improvement in Valves for Molten Glass; and I do hereby declare the following to be a full, clear, and exact description thereof.

My invention relates to devices for controlling or shutting off the flow of molten glass from a tank furnace to another receptacle such as the boot or discharge chamber of an automatic glass feeder.

One object of my invention is to provide an effective cut-off valve for molten glass constructed mainly from clay parts of simple construction, and to provide for the convenient removal and replacement of the parts of the valve which are subject to wear.

Another object of my invention is to provide a valve for controlling the flow of molten glass from a tank furnace to a glass feeder, the valve being so constructed and arranged as to receive the glass from beneath the glass level in the tank furnace, thereby furnishing to the feeder a constant supply of fresh hot glass.

Figure 1:
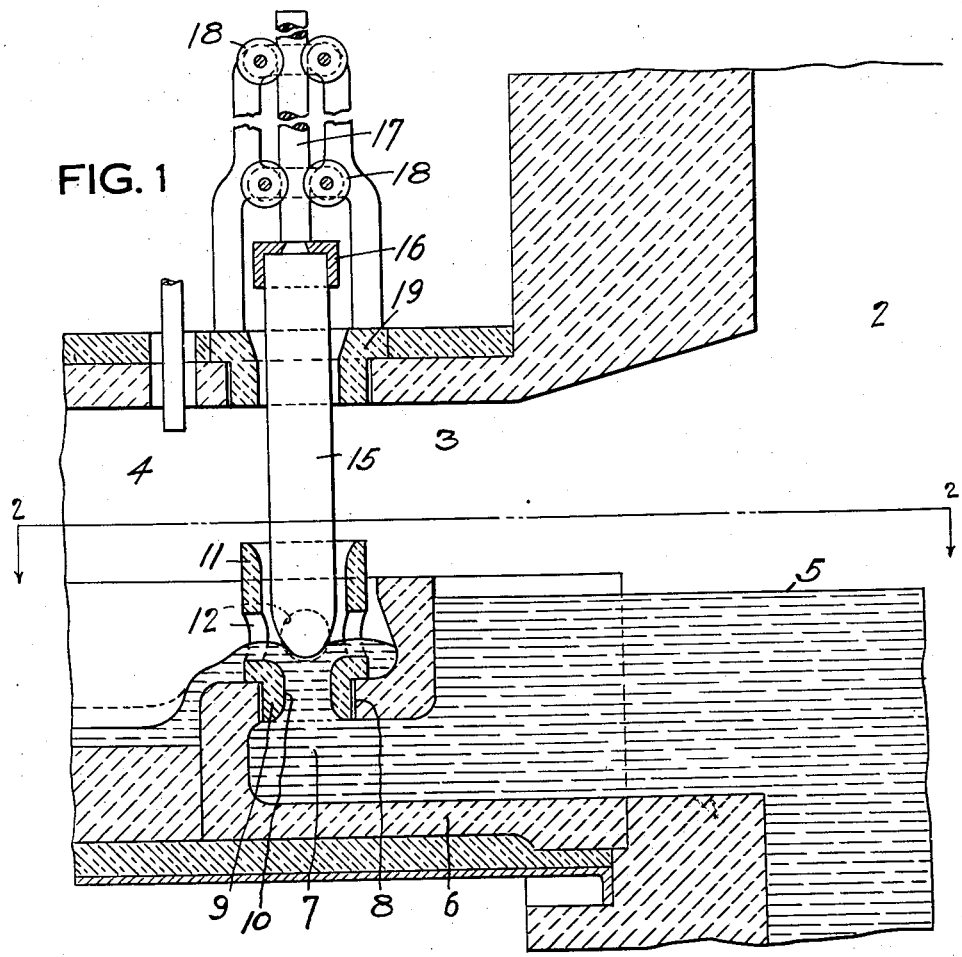
Figure 2:
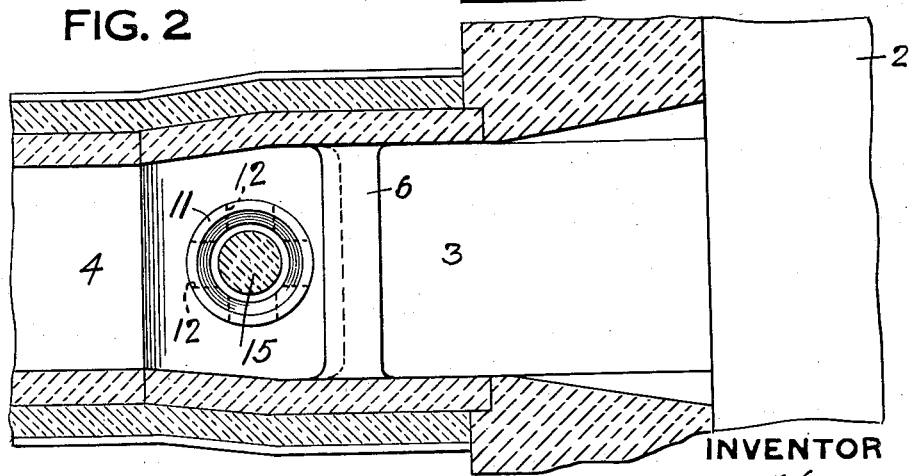
Figure 3:
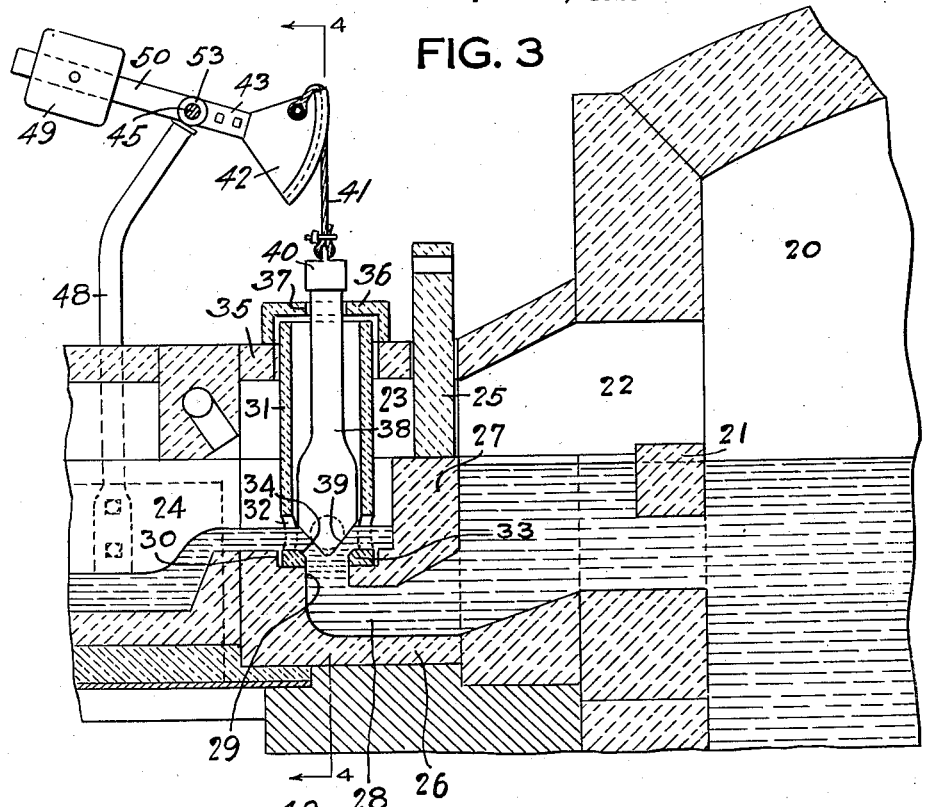
Figure 4:
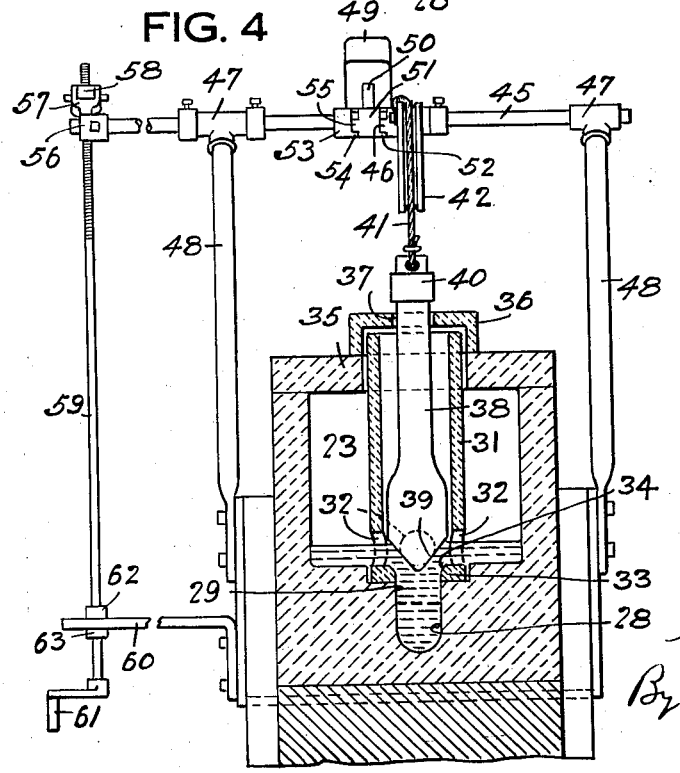
Figure 5:
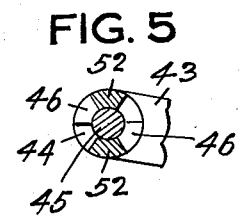

In the accompanying drawing, Fig. 1 is a longitudinal central sectional view of portions of a tank furnace and a glass-feeder, showing a valve construction embodying my invention; Fig. 2 is a horizontal sectional view of the construction shown in Fig. 1, the section being taken substantially along the line 2—2, Fig. 1; Fig. 3 is a longitudinal central sectional view showing another construction of the same general character; Fig. 4 is a transverse vertical sectional view of the construction shown in Fig. 3, the section being taken substantially along the line 4—4, Fig. 3; and Fig. 5 is an enlarged cross sectional view of the valve-operating clutch.

In my application for Letters Patent filed February 27, 1919, Serial No. 279,541, of which the present application is a continuation in part, I have shown and described a cut-off valve of the construction shown in Figs. 1 and 2 of the accompanying drawing, this valve in the parent application being illustrated in connection with an automatic feeder of the type wherein the glass is caused to flow from a tank furnace into a projecting chamber and is discharged from this chamber through a downwardly opening outlet in a succession of gathers or gobs, each of which is equal to a mold-charge. The present application is concerned mainly with the valve mechanism which controls the flow of the glass from the tank furnace into the discharge chamber and the other apparatus shown in my prior application has therefore been omitted from the present application. The modified construction shown in Figs. 3 and 4 differs from that of Figs. 1 and 2 only in minor details of construction and in the specific connections for raising and lowering the movable valve member.

The general purpose of a cut-off valve, as employed with an automatic glass feeder, is to produce a regular flow of glass from the tank furnace to the feeder, to compensate for variations which may occur in the level of the glass due to intermittent batch-charging, or to compensate for variations in the consistency of the glass due to change in temperature or other factors which affect the flow of the glass. The valve is also employed to stop the flow of glass entirely when the feeder is to be shut down and therefore it is necessary that the movable valve member be able to seat tightly upon the valve seat.

In Figs. 1 and 2 of the drawing the numeral 2 indicates a portion of a tank furnace having an extension or forehearth 3 which includes a feeding chamber 4. The glass level or metal line in the tank furnace is indicated at 5 and a partition block 6 of refractory material is provided for preventing the glass from flowing out of the forehearth 3 except through a horizontal channel 7 communicating with a vertical opening 8 in which is set a tubular wearing piece 9 having a vertical opening 10 which receives the glass from the channel 7.

The wearing piece 9 is molded from clay or other refractory material and its upper portion 11 extends a substantial distance above the glass level at the valve in order to add sufficient weight to the wearing piece to prevent it from floating in the glass when the valve is open. This wearing piece is provided with one or more openings 12 to permit the glass which rises through the opening 10 to escape into the feeding chamber 4. Four of the openings 12 are shown on Fig. 2, but it will be understood that this number may be varied. A movable valve member 15, having a rounded lower end, is arranged vertically above the opening 10 and the vertical position of this valve member determines the effective size of the valve opening. The valve member 15 may suitably be composed of clay and is suspended from a support 16 which, as shown, has a guide member 17 running between rollers 18, this guiding arrangement serving to keep the movable valve member in proper alignment with the opening 10.

Any suitable means may be provided for raising and lowering the valve member 15. If desired, this movement may be made to take place automatically in response to variations in the glass level within the tank 2. Such an automatic arrangement, including a float and connections for transmitting the movement of the float to the movable valve member, is shown in my prior application, Serial No. 279,541. However, such automatic arrangements are not essential to my present invention and the movable valve member 15 may be arranged for manual adjustment by means such as the adjusting means which are shown in Figs. 3 and 4 of the accompanying drawing and which will be described below.

In the operation of the valve shown in Figs. 1 and 2 the movable valve member is raised either manually or automatically to the proper distance above its seat in the opening 10 to permit the desired quantity of glass to rise through the opening 10 and escape through the openings 12 into the feeding chamber 4. It will be observed that the glass is taken from the tank at a level considerably below the upper surface or metal line of the glass in the tank. This insures that a constant supply of fresh hot glass is delivered to the feeder.

In this construction both the movable valve member 15 and the fixed valve member or wearing piece 9 may be removed for repair or replacement without dismantling the feeder. For this purpose the movable valve member 15 and its suspension means are mounted upon a removable block 19 which, when removed, provides an opening through which the wearing piece 8 may be lifted out.

The construction shown in Figs. 3 and 4 is designed to facilitate still further the adjustment and removal of the parts of the valve. These figures show a portion of a tank furnace 20 having a skimmer 21, and a forehearth having a rear chamber 22, a valve chamber 23 and a feeding chamber 24, the rear chamber 22 and the valve chamber 23 being separated by a movable gate 25 which may be raised or lowered to place the chamber 22 in communication or out of communication with the valve chamber and the feeding chamber as operating conditions may require. A partition block 26 having a vertical projection 27 extends across the front end of the chamber 22 and prevents the flow of glass into the feeder except through a horizontal channel 28 which is formed in the block 25 and communicates with a vertical opening 29.

Above the opening 29 a recess 30 is formed in the block 26 to receive and support the lower end of a tubular valve member 31 having openings 32 formed in its walls and having at its lower end an internal flange 33 having a conical surface 34 which forms a stationary valve seat. The tubular member 31 extends up through an opening in a cover block 35 and its upper end is closed by means of a cap 36 resting loosely upon the cover block 35. The cap 36 has a central opening 37 to receive the stem of a movable valve member 38, the lower portion of which is enlarged and is provided with a conically tapering end portion 39 which is adapted to rest upon the conical valve seat 34. The upper end of the movable valve member 37 is provided with a cap 40 to which is attached a short cable 41 which suspends the valve member from a support 42. This support is carried by an arm 43 which in turn is carried by a clutch sleeve 44 that is loosely mounted upon a horizontal bar 45 and has one or more clutch teeth 46. The bar 45 is rotatably mounted in bearings 47 which are supported by standards 48. A counterweight 49, adjustably mounted on an arm 50, over-balances the weight of the valve member 38 and its attachments. The arm 50 is carried by a clutch sleeve 51 which, like the clutch sleeve 44, is loosely mounted on the bar 45 and has one or more teeth 52 which engage the teeth 46 on the clutch sleeve 44. A clutch member 53 is rigidly secured to the bar 45 and has one or more teeth 54 engaging corresponding teeth 55 on the clutch sleeve 51.

When the shaft 45 is turned in a clockwise direction, Fig. 3, the teeth 54 of the clutch member 53 act through the teeth 55 to turn the clutch sleeve 51 and the weighted arm 51 is thereby raised, permitting the valve-support 42 to descend. When the bar 45 is rotated in the opposite direction, the arm 50 and the weight 49 are permitted to descend by their own weight and this movement is transmitted through the clutch sleeve 51 and the teeth 52 and 46 to raise the arm 43, the support 42 and the valve member 38.

The vertical adjustment of the plunger may therefore be effected by manually rotating the bar 45. For this purpose an arm 56 is rigidly secured to one end of the bar 45 and is provided at its outer end with a fork 57 in which is pivotally supported a nut 58. The upper screw-threaded end of a vertical rod 59 extends through the nut 58 and the lower end of this rod extends through an opening in a fixed bracket 60 and carries a handle 61. Two collars 62 and 63 are secured to the rod 59 above and below the bracket 60 and prevent the rod 59 from moving lengthwise while permitting it to be turned by means of the handle 61.

The counterweight and adjusting means just described provide for raising and lowering the valve member 38 in an accurate manner and without danger of breaking the valve members. If the clay valve member 38 were rigidly connected to the handle 64 or other lifting means, this valve member might be broken while being pulled forcibly from partially chilled glass. The construction just described prevents this because the only force tending to raise the valve member 38 is the weight of the arm 50 and the counterweight 49.

It will be seen that the tubular valve member 31 may be removed for replacement or inspection by disconnecting the movable valve member from its suspension, lifting off the cap 36, removing the movable valve member 38 and then lifting out the tubular member 31. This may readily be done without taking off the cover block 35 and without entering the valve chamber.

The operation of the valve shown in Figs. 3 and 4 is similar to that of the valve shown in Figs. 1 and 2. The glass from the tank furnace 20 passes under the skimmer 21 into the chamber 22 and thence through the channel 28 to the opening 29 through which it rises and is discharged through the lateral openings 32 into the feeding chamber 24.

In addition to the structural modifications herein pointed out, various other changes in the construction and arrangement of parts may be made without departing from my invention as set forth in the appended claims.

I claim as my invention:

1. A valve for molten glass comprising a support, a tubular stationary valve member resting on said support and free to be lifted therefrom, said member having an internal annular valve seat near its lower end and having at least one lateral discharge opening above said valve seat, said tubular member extending a substantial distance above said opening to give said tubular member sufficient weight to prevent it from floating in the glass when the valve is open, and an elongated vertical valve member arranged for vertical adjustment above said valve seat.

2. A valve for molten glass comprising a support having an opening formed therein, and a tubular stationary valve member at said opening, the said tubular member having an internal annular valve seat, an inlet opening of reduced diameter below said valve seat and a lateral discharge opening above said valve seat, and a movable valve member extending into said tubular valve member and having its lower end shaped to enter said reduced inlet opening and to rest upon said annular valve seat.

3. A valve for molten glass comprising a partition member having a vertical opening therein, a vertical tubular valve member extending into said opening and having an internal annular valve seat and also having an opening above said valve seat, and an elongated vertically movable valve member having its lower end shaped to rest upon said annular valve seat.

4. A valve for molten glass comprising a partition member having a horizontal inlet channel communicating with an upwardly extending opening, a vertical tubular valve member resting on said partition member at said opening, said valve member having an internal annular valve seat and at least one lateral discharge opening above said valve seat, and an elongated, vertically movable valve member having its lower end shaped to rest upon said annular valve seat.

5. A valve for molten glass comprising a vertical support, a tubular valve member resting on said support and free to be lifted therefrom, said member being adapted to be partially immersed in molten glass and extending sufficiently above said glass to prevent said tubular member from floating in the glass, said valve member having an internal annular valve seat, and an elongated vertically movable valve member having its lower end within said tubular member and adapted to rest upon said annular valve seat.

6. A valve for molten glass comprising a horizontal partition member provided with an inlet channel and with a vertical opening communicating with said channel, a tubular stationary valve member having its lower end supported on said partition in line with said opening and having an internal annular valve seat and at least one lateral discharge opening above said valve seat, and an elongated vertically movable valve member having a tapered lower end adapted to rest upon said annular valve seat.

7. A valve for molten glass comprising a support, a normally stationary but removable valve member resting loosely upon said support and partially immersed in molten glass, and tending to float in said glass, said stationary valve member extending sufficiently above the glass level at said valve to prevent said valve member from floating in the glass, and a movable valve member cooperating with said normally stationary valve member.

8. Glass-handling apparatus comprising a container for molten glass provided with a cover having an opening, a supporting member removably disposed in said opening, a movable valve member supported by said supporting member, and a normally stationary valve member cooperating with said movable valve member, said normally stationary valve member being removable from said apparatus through the said opening when said supporting member is removed, In testimony whereof I, the said GEORGE E. HOWARD, have hereunto set my hand.

GEORGE E. HOWARD.